United States Patent [19]

Kummer et al.

[11] 4,407,902

[45] Oct. 4, 1983

[54] CHEMICALLY REGENERABLE REDOX FUEL CELL AND METHOD OF OPERATING THE SAME

[75] Inventors: Joseph T. Kummer, Ypsilanti; Djong-Gie Oei, Dearborn, both of Mich.

[73] Assignee: Ford Motor Company, Dearborn, Mich.

[21] Appl. No.: 214,365

[22] Filed: Dec. 8, 1980

[51] Int. Cl.³ .............................................. H01M 8/06
[52] U.S. Cl. ........................................ 429/15; 429/17; 429/20; 429/34
[58] Field of Search ....................... 429/13, 15, 17, 19, 429/20, 14, 34

[56] References Cited

U.S. PATENT DOCUMENTS

| | | | |
|---|---|---|---|
| 3,531,326 | 9/1970 | Stankavitch | 429/17 |
| 3,540,932 | 11/1970 | Zaromb | 429/15 |
| 3,540,933 | 9/1970 | Boeke | 429/19 |
| 3,682,704 | 8/1972 | Keefer | 429/19 |
| 4,105,892 | 8/1978 | Venero | 429/15 |

*Primary Examiner*—Anthony Skapars

*Attorney, Agent, or Firm*—William E. Johnson; Olin B. Johnson

[57] ABSTRACT

A chemically regenerable redox fuel cell is disclosed. This fuel cell is one in which the oxidant is oxygen and the fuel is hydrogen. A catholyte solution is used. The catholyte solution is one which is reoxidized from a reduced state to an oxidized state by direct exposure of the catholyte solution to oxygen. An anolyte solution is also used. This anolyte solution is one which is reduced from an oxidized state to a reduced state by direct exposure of the catholyte solution to hydrogen. Structure is provided for containing in separate containers the catholyte solution and the anolyte solution, and for providing oxygen to the catholyte solution and hydrogen to the anolyte solution. A suitable cationic exchange membrane is housed in a housing and provided with volumes on opposite sides of the membrane for the catholyte solution and anolyte solution so that the necessary exchanges may take place to form the redox cell. All necessary plumbing and electrical systems are provided to supply the catholyte and anolyte solutions to the cationic exchange membrane and to obtain from the exchange which takes place at the membrane the electrical potential generated.

3 Claims, 1 Drawing Figure

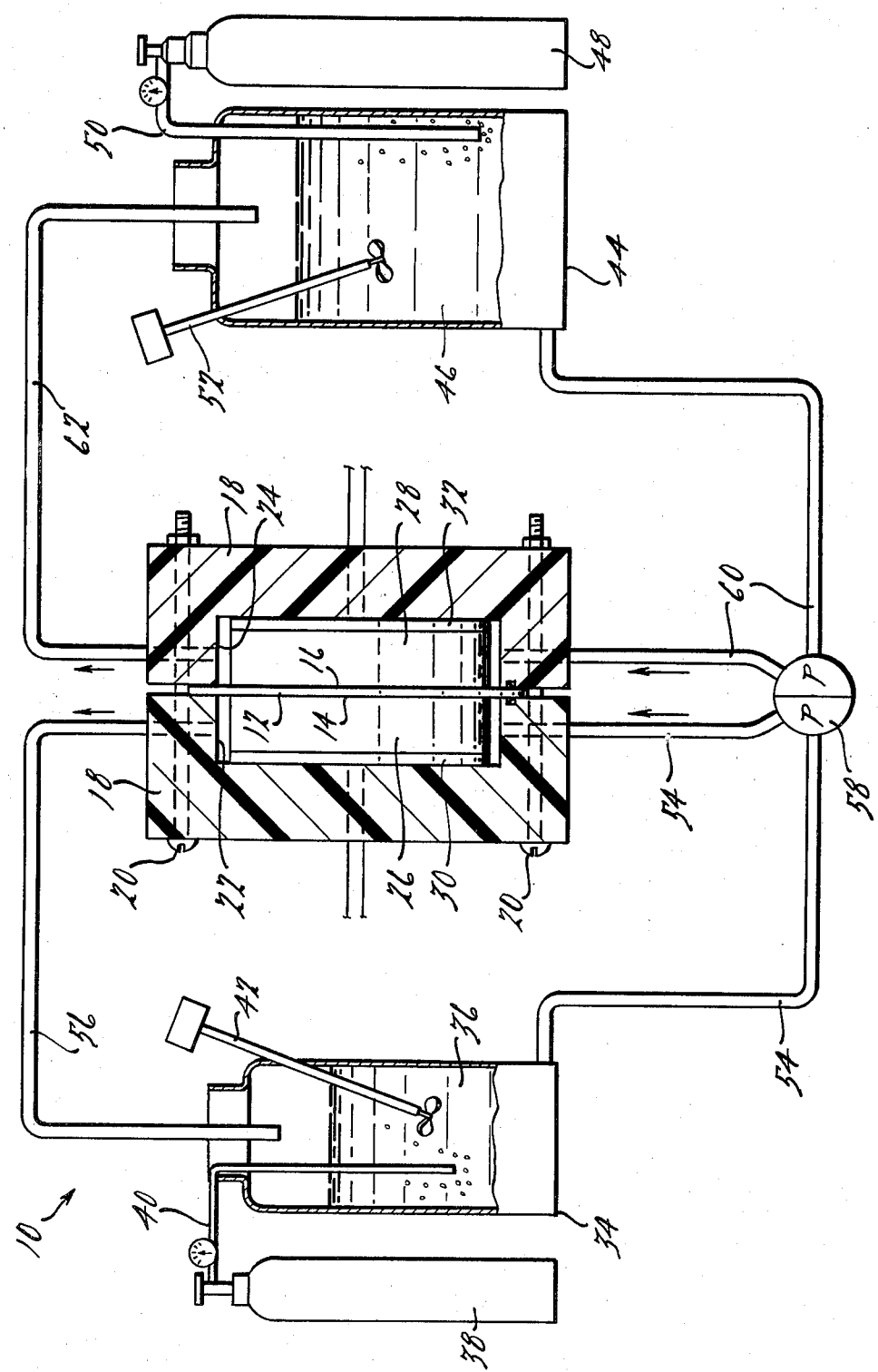

CHEMICALLY REGENERABLE REDOX FUEL CELL AND METHOD OF OPERATING THE SAME

BACKGROUND OF THE INVENTION AND PRIOR ART STATEMENT

Ford Motor Company, the assignee of this application, did not conduct a novelty study on this subject matter in the U.S. Patent Office. Therefore, we are unaware of any prior art which may be on file in the U.S. Patent Office that may be relevant to the subject matter of this application.

We are aware, however, that a general discussion has been undertaken in the literature proposing chemically regenerable redox fuel cells in which a catholyte solution is oxidized directly to its oxidized state by oxygen gas and an anolyte solution is reduced directly to its reduced state by direct action of a reducing agent such as carbon (A.M. Posner, Fuel 34 330 (1955)). However, in these reports, we are unaware of any discussion of any practical working cell using aqueous electrolytes in which the direct action of oxygen and hydrogen are used to regenerate solutions used in the redox fuel cell.

A redox fuel cell in which the catholyte solution can be directly regenerated by the action of oxygen gas and the anolyte solution similarly can be directly regenerated by the action of hydrogen gas is a highly desirable fuel cell. Such a redox fuel cell could be termed an indirect hydrogen/oxygen fuel cell, as hydrogen and oxygen are the only two chemical ingredients to be chemically spent in generating the electric power from the fuel cell. The catholyte solution and anolyte solution remain functionally intact and continue in operation for as long as one desires to operate the redox fuel cell. Since this approach avoids an expensive catalyzed three-phase conventional electrode, the cost of operating such a fuel cell is kept at a minimum, while the efficiency thereof remains high.

Since the catholyte and anolyte solutions are regenerated respectively by the action of oxygen and hydrogen thereon, such regeneration may take place at a location spaced away from the fuel cell and at a different temperature from the fuel cell, thus permitting relatively simple and unsophisticated equipment to construct the fuel cell itself and associated equipment.

It is a principal object of this invention to provide a chemically regenerable redox fuel cell in which the oxidant is oxygen and the fuel is hydrogen, and in which the oxidant is directly exposed to the catholyte solution in order to regenerate the same, while the hydrogen is exposed directly to the anolyte solution to regenerate the same.

SUMMARY OF THE INVENTION

This invention relates to a redox fuel cell and, more particularly, to a redox fuel cell in which the oxidant is oxygen and the fuel is hydrogen. In accordance with the teachings of the construction of this invention, the redox fuel cell which we have invented includes the following structure.

A catholyte solution is provided. This catholyte solution is one which is reoxidized from a reduced state to an oxidized state by direct exposure of the catholyte solution to oxygen. The catholyte solution is also electrochemically reducible from its oxidized state to its reduced state. In a similar manner, an anolyte solution is provided. This anolyte solution is one which is reduced from an oxidized state to a reduced state by direct exposure of the anolyte solution to hydrogen. The anolyte solution is also electrochemically oxidizable from its reduced state to its oxidized state.

The fuel cell includes a cationic exchange membrane having first and second faces. These first and second faces of the cationic exchange membrane are separated by the thickness of that membrane. A housing is provided which defines (i) a first open volume in association with the first face of the cationic exchange membrane, and (ii) a second open volume in association with the second face of the cationic exchange membrane. Electrolyte support and electrode structure is located in the first open volume and the second open volume of the housing structure. The electrolyte support and electrode structure holds electrolyte solutions therein. Also, an electrical terminal structure is provided for making electrical contact with the electrolyte support and electrode structure located in each of the open volumes.

An oxidant reservoir contains the catholyte solution. A first gas supply structure provides oxygen to the oxidant reservoir. A first fluid supply and fluid return line structure is used to provide fluid supply and fluid return lines between the oxidant reservoir and the first open volume of the housing structure. A reductant reservoir contains the anolyte solution. A second gas supply structure supplies hydrogen to the reductant reservoir. A second fluid supply and fluid return line provides fluid supply and fluid return lines between the reductant reservoir and the second open volume of the housing structure.

Pumps are provided for pumping (i) the catholyte solution through the first supply and fluid return line structure, and (ii) the anolyte solution through the second supply and fluid return line structure. In such a manner, catholyte solution which has been oxidized by being directly exposed to oxygen supplied by the first gas supply structure to the oxidant reservoir is pumped through the fluid supply line of the first fluid supply and fluid return line structure to the first open volume of the housing structure whereat the catholyte in its oxidized state may be electrochemically reduced to its reduced state and thereafter returned by the fluid return line of the first fluid supply and fluid return line structure to the oxidant reservoir. In a similar manner, anolyte solution which has been reduced by being directly exposed to hydrogen supplied by the second gas supply structure to the reductant reservoir is pumped through the fluid supply line of the second fluid supply and return line structure to the second open volume of the housing structure whereat the anolyte solution in its reduced state may be electrochemically oxidized to its oxidized state and thereafter returned by the fluid return line of the second fluid supply and fluid return line structure to the reductant reservoir.

In accordance with the teachings of a preferred embodiment of the redox cell of this invention, the catholyte is $VOSO_4$ solution to which has been added a soluble catalyst for the regeneration of this solution in the presence of oxygen to $(VO_2)_2SO_4$ solution, which is the oxidized form of the catholyte. The preferred catalyst is heteropoly acid $H_5PMo_{10}V_2O_{40}$. The heteropoly acid $H_3PMo_{12}O_{40}$ can also be used. Such a catalyst is generally used to increase the oxidation rate of the plus four valence V to the plus five valence V.

Once again, in accordance with a preferred teaching of the redox cell of this invention, the anolyte solution is a solution of tungstosilicic acid, $H_4SiW_{12}O_{40}$, or tungstophosphoric acid, $H_3PW_{12}O_{40}$. In the presence of a very small amount of platinum, palladium, rhodium, ruthenium, palladium tetrasulfophthalocyanine or tungsten carbide, this solution can be reduced by hydrogen at 25° C. to form $H_5SiW_{12}O_{40}$ or $H_4PW_{12}O_{40}$, which is the reduced form of the anolyte.

In accordance with the teachings of this invention, a method of operating a chemically regenerable redox fuel cell has the following steps:

A catholyte solution is provided. This catholyte solution is one which can be reoxidized from a reduced state to an oxidized state by direct exposure of the catholyte solution to oxygen. The catholyte solution is also reducible from its oxidized state to its reduced state.

An anolyte solution is provided. This anolyte solution is one which can be reduced from an oxidized state to a reduced state by direct exposure of the anolyte solution to hydrogen. The anolyte solution is also oxidizable from its reduced state to its oxidized state.

The catholyte solution is exposed to oxygen at a first reservoir. The first reservoir is heated to a temperature suitable for oxidation of said catholyte solution. The anolyte solution is exposed to hydrogen at a second reservoir. The second reservoir is heated to a temperature suitable for reduction of said anolyte solution.

A cationic exchange membrane is provided which has first and second faces separated by a thickness thereof. The catholyte solution is circulated between the first reservoir and one face of the cationic exchange membrane. The anolyte solution is circulated between the second reservoir and the other face of the cationic exchange membrane. In this manner, the catholyte solution is alternately oxidized at the first reservoir and reduced at the one face of the cationic exchange membrane and the anolyte solution is alternatively reduced at the second reservoir and oxidized at the other face of the cationic exchange membrane.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, in which the figure is a schematic drawing of a redox fuel cell built in accordance with the teachings of this invention.

DESCRIPTION OF THE PREFERRED EMBODIMENT

A description will be set forth hereinbelow of a preferred embodiment of a redox fuel cell formed in accordance with the teachings of this invention. This redox fuel cell is one in which the oxidant is oxygen and the fuel is hydrogen. In order to facilitate this description, the overall makeup of the redox fuel cell will be described initially and thereafter the particular materials preferably used to form the catholyte and anolyte will be discussed with particularity.

Fuel Cell Construction

In the drawing, a redox fuel cell is generally identified by the numeral 10. The redox fuel cell of this invention is one in which the oxidant is oxygen and the fuel is hydrogen. This type of fuel cell will use a catholyte solution and an anolyte solution, both of which will be described in greater detail hereinbelow.

At the heart of the redox cell 10 is a cationic exchange membrane 12. While many different membranes are available, in this application, for this embodiment, we preferred, as this membrane, a material sold by DuPont under the name NAFION 415. This membrane has a first face 14 and a second face 16 which are separated from one another by the thickness dimension of that membrane. A two-part housing structure 18—18 is formed from identically shaped circular blocks of a plastic material such as Teflon, polymethacrylate or polycarbonate. The housing structures 18—18 are held together by a plurality of bolts 20—20 in a manner well known to the artisan. The housing structures 18—18 also have respectively defined therein a first open volume 22 and a second open volume 24 which are respectively in association with the one face 14 and the other face 16 of the cationic exchange membrane 12. A first electrolyte support and electrode structure 26 is supported in the first open volume 22 of the housing structure, and in a similar fashion, a second electrolyte support and electrode structure 28 is supported in the second open volume 24 of the housing structure. Normally, these electrolyte support and electrode structures are formed from materials such as porous carbon, carbon with a graphite felt electrode, solid carbon foam, but in this particular case we selected graphite felt material such as VDG sold by Union Carbide to serve as this material. This material not only supports electrolyte materials therein, but also permits passage of these materials therethrough through normal flow and wicking actions. The material serves as an electrode for either the electrochemical reduction of the cathode or electrochemical oxidation of the anolyte.

A first electrical terminal structure 30 is provided in the first open volume 22 in contact with the first electrolyte support and electrode structure 26. In a similar fashion, a second electrical terminal structure is provided in the second open volume 24 of the housing structure 18 in electrical contact with the second electrolyte support and electrode structure 28.

An oxidant reservoir 34 is filled with an oxidant solution 36. A first gas supply structure 38 is connected by means of a gas supply line 40 to the oxidant reservoir 34 so that the first gas supply structure 38 may supply oxygen to the oxidant solution 36 contained within the oxidant reservoir. An oxidant mixing device 42 is provided to agitate the oxidant solution during the time that oxygen is supplied to the oxidant reservoir so that the gas is able to intimately contact the oxidant solution.

In a similar manner, a reductant reservoir 44 contains a reductant solution 46. A second gas supply structure 48, through a gas supply line 50, supplies hydrogen gas to the reductant solution confined within the reductant reservoir. A reductant mixing device 52 is provided to agitate the reductant solution within the reductant reservoir during the time the hydrogen gas is bubbled therethrough so that an intimate mixing of the hydrogen gas and reductant solution can take place.

A first fluid supply and fluid return line structure includes a fluid supply line 54 and a fluid return line 56 which interconnect the first open volume 22 of the housing structure 18 and the oxidant solution 36 confined within the oxidant reservoir 34 so that flow may be established therebetween. A pump 58 is used to pump the oxidant solution 36 through the fluid supply line 54 to the first open volume 22 of the housing structure 18 and then through the fluid return line 56 to the oxidant reservoir.

In a similar manner, second fluid supply and return line structure includes a second fluid supply line 60 and a second fluid return line 62. In the case of the reductant solution 46, the pump 58 is effective to pump that solution through the second fluid supply line 60 to the second open volume 24 of the housing structure 18 and then through the fluid return line 62 once again to the interior of the reductant reservoir 44, thereby to establish the reductant flow necessary for the redox cell of this invention.

Now that there has been described the physical construction of the redox cell, the individual solutions used as the oxidant solution 36 and the reductant solution 46 will be discussed in detail hereinbelow.

Fuel Cell Solutions

The preferred catholyte taught in this specification for the formation of the redox fuel cell is $VOSO_4$ solution to which has been added a suitable catalyst for the regeneration of this solution in the presence of oxygen to $(VO_2)_2SO_4$ solution, which is the oxidized form of the catholyte. A preferred catalyst used in this solution is heteropoly acid $H_5PMo_{10}V_2O_{40}$. The heteropoly acid $H_3PMo_{12}O_{40}$ can also be used. These catalysts accomplish a rapid oxidation of plus four valence V to plus five valence V (see Table A).

small amount of platinum, palladium, ruthenium, rhodium, palladium tetrasulfophathalocyanine or tungsten carbide, this anolyte solution can be reduced by hydrogen, normally accomplished at about 25° C. to a dark blue solution of $H_5SiW_{12}O_{40}$ or $H_4PW_{12}O_{40}$, which is the reduced form of the anolyte (see Table B).

In accordance with the method of this invention, the catholyte and anolyte solutions are heated in their respective reservoirs to a temperature suitable for oxidation of the catholyte solution and a temperature suitable for reduction of the anolyte solution. By "a suitable temperature" we mean, in this specification and claims, any temperature within a range of temperatures about the particular temperature or temperature range at which the thermodynamics of the reaction system favors the production of the product most desired. In the case of the catholyte solution, the desired product is the oxidized form of the catholyte. In the case of the anolyte solution, the desired product is the reduced form of the anolyte.

TABLE B

| | | | | | | | | |
|---|---|---|---|---|---|---|---|---|
| REDUCTION OF SILICOTUNGSTIC ACID[1] ||||||||||
| $H_4SiW_{12}O_{40}$·$24H_2O$ Conc. g/l | $H_3PO_4$ Conc. g/l | Gas Used 1 ATM Total Pressure | Temp. C.° | Time Mins. | Catalyst Composition | Conc. g/l | % Reduced (1 Election Reduction) | Volts of Reduced Solution vs. Calomel |
| 152 | 57.42 | $H_2$ | 25 | 8 | P + $O_2$ | 0.8 | 82 | −0.27 |
| " | " | " | 76 | 8 | P + $O_2$ | 0.8 | 29 | −0.25 |
| " | " | " | 25 | 16 | P + $Cl_4$ | 0.2 | 92 | |
| " | " | " | " | 20 | Ru | 2.9 | 92 | −0.25 |
| " | " | " | " | 100 | WC | 18.4 | 13 | |
| " | " | " | " | 9 | P + $S_2$ | 1.0 | 86 | |
| " | " | " | " | 11 | PdPC* | 1.8 | 71 | |
| " | " | " | " | 1.5 | $PtO_2$ | 4.9 | 86 | |
| " | " | " | " | 0.8 | $PtO_2$ | 9.9 | 92 | |
| " | " | " | " | 2.9 | 1.1% Pt on $SiO_2$ | 12.8 | 46 | |
| 304 | " | " | " | 5.2 | 1.1% Pt on $SiO_2$ | 12.8 | 91 | |
| " | " | " | " | 4.0 | 1.1% Pt on $SiO_2$ | 25.6 | 75 | |

*Palladium 4, 4', 4", 4"' tetrasulfophthalocyanine.
[1]Solution (25 cc) agitated with Teflon coated bar magnet stirrer in 125 cc flask.

The invention will be illustrated in the following examples.

EXAMPLE 1

A catholyte sample of 240 ml is made that is 0.8 $VOSO_4$ and 0.059 molar $H_5PMo_{10}V_2O_{40}$. The solution pH is 0.67.

The $H_5PMo_{10}V_2O_{40}$ is made by mixing 454 grams of

TABLE A

| | | | | | | | | |
|---|---|---|---|---|---|---|---|---|
| Oxidation of Vandyl Solutions Using Polyion Catalysts[1] |||||||||
| $VOSO_4$ Solution Molarity | Solution $pH^{(2)}$ Start | Solution $pH^{(2)}$ End | Gas Used 1 ATM Total Pressure | Temp. C.° | Time Mins. | Catalyst Composition | Conc. g/l | % $V^{+4}$ Oxidized | Voltage vs. Calomel of Oxidized Solution |
| 1 | 1.3 | 1.0 | $O_2$ | 76 | 15 | $H_3PMo_{12}O_{40}$ | 24 | 11.8 | 0.64 |
| 0.5 | 1.4 | 1.3 | $O_2$ | 82 | 30 | | 4.5 | 14.0 | 0.61 |
| 0.5 | 2.0 | 1.3 | $O_2$ | 82 | 30 | | 4.5 | 26.7 | 0.60 |
| 1.0 | 1.0 | 0.9 | $O_2$ | 76 | 15 | $H_5PV_2Mo_{10}O_{40}$ | 20 | 13.5 | 0.63 |
| 1.0 | 1.0 | 0.9 | Air | 76 | 30 | | 24 | 7.0 | 0.58 |
| 1.0 | 0.7 | 0.6 | $O_2$ | 76 | 15 | | 40 | 8.3 | 0.63 |
| 0.5 | 1.0 | 1.0 | $O_2$ | 83 | 30 | No Catalyst | | 0.0 | 0.54 |

[1]Solution (25 cc) agitated with Teflon coated bar magnet stirrer in 125 cc flask.
[2]Solution pH adjusted at start of experiment with $H_3PO_4$.

Additionally, in accordance with the preferred teachings of this invention, the anolyte solution is formed from tungstosilicic acid, $H_4SiW_{12}O_{40}$, or tungstophosphoric acid, $H_3PW_{12}O_{40}$. In the presence of a very $MoO_3$, 58.5 grams $V_2O_5$, and 22 snl of 85% $H_3PO_4$, and making up the total volume to 900 cc with water. This mixture was heated with stirring at 80° C. overnight and the small amount of unreacted material filtered off. The filtrate contained 0.6 gram $H_5PMo_{10}V_2O_{40}$ per ml and had a pH=0. An appropriate portion of this solution was used as a source of the $H_5PMo_{10}V_2O_{40}$.

The anolyte solution of 250 ml is 0.12 molar in silico-tungstic acid ($H_4SiW_{12}O_{40} \cdot 24H_2O$) and one molar in $H_3PO_4$. THe anolyte includes 25 mg $PTO_2$ added as a catalyst.

When these two solutions are pumped through their respective compartments of the fuel cell using silicone tubing, the open circuit voltage of the fuel cell is near zero. Upon oxidizing the catholyte solution with $O_2$ at 76° C. 1 ATM total pressure for one-half hour and reducing the anolyte solution with $H_2$ 1 ATM total pressure at 25° C. for one-half hour (the solution turns blue), the open circuit voltage of the fuel cell was found to be slightly higher than 0.9 volt.

EXAMPLE 2

The experiment as set forth in Example 1 was carried on once again with the only change being in the catalyst used. In this case, the catalyst was two grams of silica (Cabo-Sil; Cabot Corp.) containing 1.1% Pt. In this cast at a current density of 17.1 ma per $cm^2$, the cell voltage was 848 mv. The cell was operated in the redox mode for 335 minutes. At the end of this time, the voltage was 777 mv and the current density 15.8 $ma/cm^2$.

EXAMPLE 3

The experiment as set forth in Example 1 was carried out once again with the only change being in the catalyst used. In this case, the catalyst was two grams of the soluble palladium compound, palladium 4'4'"4" tetrasulfophthalocyanine (prepared by the method of Weber and Busch, Incogranic Chem. 4, 469 (1965)), using $PdCl_2$ as the inorganic salt).

EXAMPLE 4

The experiment as set forth in Example 3 was carried out once again with the only change being in the catholyte solution being buffered by 50 grams of $NaHSO_4 \cdot H_2O$ and five grams of $Na_2SO_4$, and the anolyte being acidified with five ml of $H_2SO_4$ in place of seven ml of $H_3PO_4$.

While particular embodiments of the invention have been illustrated and described, it will be obvious to those skilled in the art that various changes and modifications may be made without departing from the invention, and it is intended to cover in the appended claims all such modifications and equivalents as fall within the true scope and spirit of this invention.

What is claimed is:

1. A method of operating a chemically regenerable redox fuel cell which comprises the steps of:
   providing a catholyte solution, said catholyte solution being one which is reoxidized from a reduced state to an oxidized state by direct exposure of said catholyte solution to oxygen, said catholyte solution also being reducible from its oxidized state ot its reduced state;
   providing an anolyte solution, said anolyte solution being one which is reduced from an oxidized state to a reduced state by direct exposure of said anolyte solution to hydrogen, said anolyte solution also being oxidizable from its reduced state to its oxidized state;
   exposing said catholyte solution to oxygen at a first reservoir;
   heating said first reservoir to a temperature suitable for oxidation of said catholyte solution;
   exposing said anolyte solution to hydrogen at a second reservoir;
   heating said second reservoir to a temperature suitable for reduction of said anolyte solution;
   providing a cationic exchange membrane having first and second faces separated by a thickness thereof;
   circulating said catholyte solution between said first reservoir and one face of said cationic exchange membrane;
   circulating said anolyte solution between said second reservoir and the other face of said cationic exchange membrane;
   whereby said catholyte solution is alternately oxidized at said first reservoir and reduced at said one face of said cationic exchange membrane and said anolyte solution is alternatively reduced at said second reservoir and oxidized at said other face of said cationic exchange membrane.

2. The method of claim 1, wherein said catholyte solution is a $VOSO_4$ solution to which has been added a suitable catalyst for the regeneration of this solution in the presence of oxygen to $(VO_2)_2SO_4$; and said anolyte solution is a solution selected from the group consisting of $H_4SiW_{12}O_{40}$ and $H_3PW_{12}O_{40}$ to which has been added a suitable catalyst for the regeneration of this solution in the presence of hydrogen.

3. The method of claim 2, in which said first reservoir containing said catholyte solution is heated to a temperature of about 76° C. and said second reservoir containing said anolyte solution is heated to a temperature of about 25° C.